(12) United States Patent
Hack et al.

(10) Patent No.: US 7,538,532 B2
(45) Date of Patent: May 26, 2009

(54) BIDIRECTIONAL POWER CONVERSION WITH MULTIPLE CONTROL LOOPS

(75) Inventors: Thomas P. Hack, Bedford, NH (US); Robert C. Dobkin, Monte Sereno, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 12/076,302

(22) Filed: Mar. 17, 2008

(65) Prior Publication Data
US 2008/0164853 A1 Jul. 10, 2008

Related U.S. Application Data

(62) Division of application No. 11/114,267, filed on Apr. 25, 2005, now Pat. No. 7,348,767, which is a division of application No. 10/270,799, filed on Oct. 11, 2002, now Pat. No. 6,894,461.

(51) Int. Cl.
*G05F 1/40* (2006.01)

(52) U.S. Cl. .................................. 323/284; 327/427

(58) Field of Classification Search ................. 327/410, 327/413, 427, 484; 323/247, 283, 284, 290
See application file for complete search history.

(56) References Cited

U.S. PATENT DOCUMENTS

| 6,243,277 | B1 * | 6/2001 | Sun et al. ....................... 363/65 |
| 6,344,756 | B1 | 2/2002 | Cecchi et al. |
| 6,667,893 | B2 * | 12/2003 | Daun-Lindberg et al. ..... 363/65 |
| 2005/0208344 | A1 * | 9/2005 | Tan .............................. 429/7 |

\* cited by examiner

*Primary Examiner*—Jessica Han
(74) *Attorney, Agent, or Firm*—McDermott Will & Emery LLP

(57) ABSTRACT

Bidirectional power conversion systems provide the ability to change power attributes to and from a component. Current bidirectional power conversion systems use a unidirectional power converter for each direction. The integration of the two normally independent power converters results in a bidirectional power converter with nearly half the size, weight, volume, cost and complexity. Described are embodiments of bidirectional power conversion systems that allow power transfer between two or more components without requiring the use of separate unidirectional power converters.

2 Claims, 14 Drawing Sheets

BIDIRECTIONAL POWER CONVERSION WITH MULTIPLE CONTROL LOOPS

RELATED APPLICATIONS

This application is a Divisional of U.S. application Ser. No. 11/114,267, filed Apr. 25, 2005, now U.S. Pat. No. 7,348,767 which is a Divisional of U.S. Application No. 10/270,799, filed Oct. 11, 2002 now U.S. Pat. No. 6,894,461, the entire contents of each of which are hereby incorporated by reference.

BACKGROUND OF THE INVENTION

This invention relates to systems and methods for producing bidirectional power conversion. More specifically, this invention relates to circuits and methods for creating a truly bidirectional power converter with multiple control loops and power routing.

As the need for smaller and more intricate integrated circuits surfaces, so does the need for smaller power routing and power conversion processes. Power routing and power conversion processes may be found, for example, in uninterruptible power systems, next-generation automotive electrical systems, redundant battery systems for computers, telecommunications equipment and portable electronic devices.

Bidirectional power conversion provides the ability to change power attributes to and from a component. Bidirectional power conversion may be found in portable devices such as cell phones and Personal Digital Assistants (PDAs) that contain rechargeable batteries. These DC rechargeable batteries are automatically charged when connected to an AC power source. During battery charging, the power from the AC power source is converted into DC power (either externally with a wall adapter or within the portable device circuitry), and the battery is charged. Additionally, during battery charging, the portable device operates using the power supplied from the AC power source. When the portable device is not connected to the AC power source or wall adapter, the battery serves as the primary power source. This process of supplying power to and receiving power from the battery is in accordance with the principles of bidirectional power conversion. Furthermore, the process of routing power from the DC battery instead of the AC power source or wall adapter is present in such systems.

In prior systems, truly bidirectional power conversion is not realized. Instead, prior systems perform bidirectional power conversion through two separate unidirectional power converters and an additional power routing system to switch between the two converters. Each separate unidirectional power converter is dedicated to the power conversion process associated with a particular direction. The result of using multiple power converters in addition to additional logic for the purpose of routing in prior systems is that the amount of switches present is inopportunely large.

In light of the foregoing, it would be desirable to provide a truly bidirectional power converter with multiple control loops and power routing in order to reduce the complexity, size and cost associated with current converters that utilize multiple unidirectional power converters.

SUMMARY OF THE INVENTION

The present invention provides systems and methods for providing bidirectional power conversion using a single converter and controller for power routing. Through the use of only a single converter and controller, the amount of switches used in fabricating the circuit of the present invention is significantly reduced. In fact, the number of necessary switches may be nearly halved. Moreover, the volume, cost, complexity, and size of a bidirectional power converter in accordance with the principles of the present invention may also be nearly halved.

In addition to the above, further consideration relating to bidirectional power conversion should preferably also be given to the need for relatively high efficiency, which is measured as a ratio of the power output to the power input. Higher efficiency can be achieved by reducing system losses, and can enable extended battery operating time. The present invention therefore combines power routing and power conversion, and in doing so, eliminates the necessity for several switches and reduces total power ($I^2R$) losses. Furthermore, the power supply switching techniques used in accordance with the principles of the present invention provide additional efficiency in bidirectional power conversion systems.

Moreover, although the following methods and systems to be presented assume external AC-DC conversion (e.g., power from an AC power source is converted externally by a wall adapter to supply DC power to be used in the bidirectional power converter), the present invention is not limited in this manner. AC-DC and DC-AC converters are readily available and may be incorporated into the embodiments of the present invention, though they have been excluded from the embodiments described in applicants' specification in order to avoid the inclusion of material that would unnecessarily complicate the description of the present invention.

BRIEF DESCRIPTION OF THE DRAWINGS

The above-mentioned objects and features of the present invention will be more clearly understood from the following detailed description considered in conjunction with the following drawings, in which the same reference numerals denote the same structural elements throughout, and in which.

DETAILED DESCRIPTION OF THE INVENTION

Figure 1:
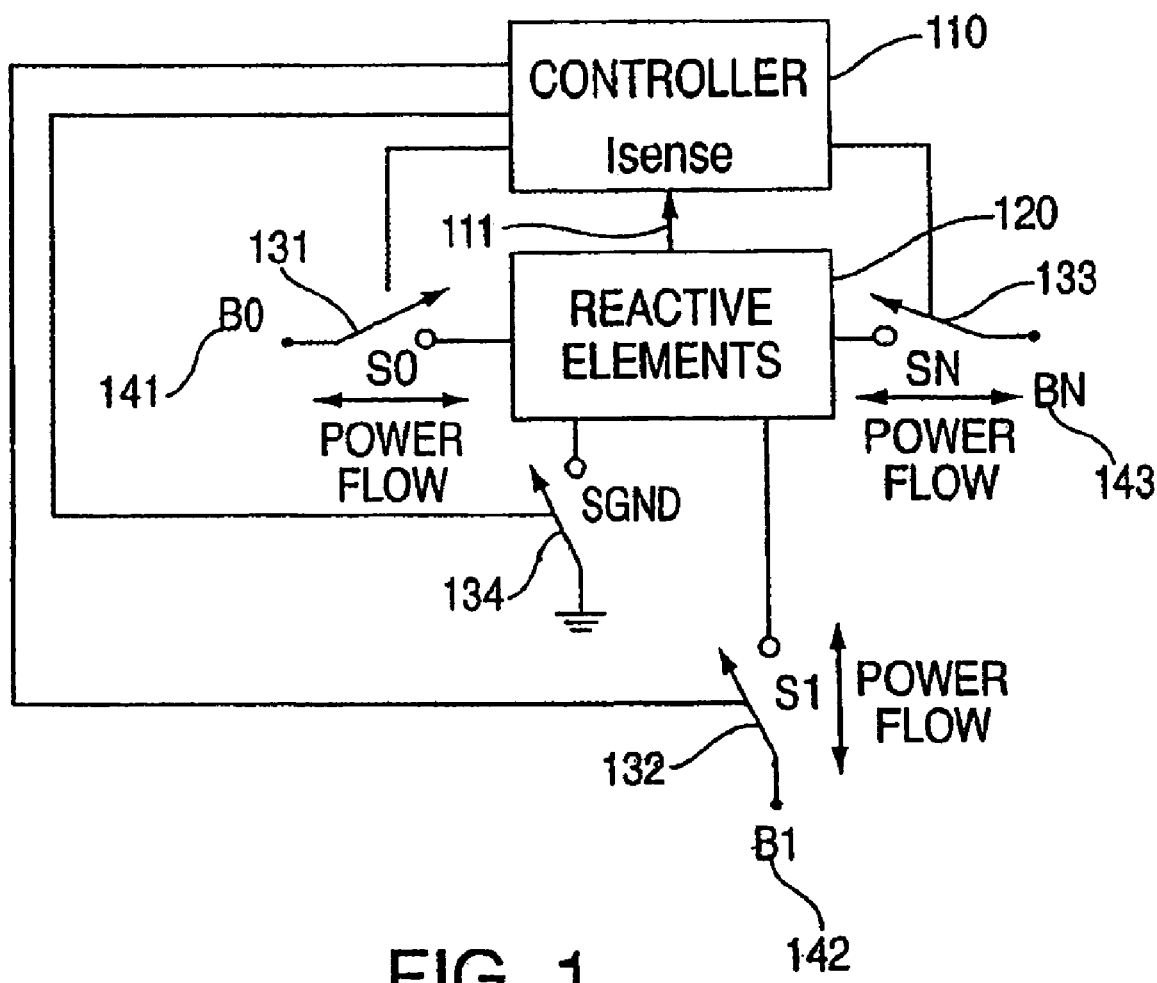
FIG. 1 is a block diagram of a bidirectional power converter in accordance with the principles of the present invention.

FIG. 1 shows a simplified schematic 100 of a bidirectional power converter in accordance with the principles of the present invention. Schematic 100 comprises controller 110, reactive elements 120, switches S0 131, S1 132, SN 133 and SGND 134 and power buses B0 141, B1 142 and BN 143. In schematic 100, as well as in the following circuits to be presented in accordance with the principles of the present invention, the switches shown are generally single-pole, single-throw switches. In practice, these switches may be realized, for example, by using semiconductor devices such as power metal-oxide semiconductor field effect transistors (MOSFETS), insulated gate bipolar transistors (IGBTs), bipolar junction transistors (BJTS), thyristors or other suitable devices.

Switch S0 131 of FIG. 1 is used to control the flow of power between bus B0 141 and reactive elements 120. Similarly, switches S1 132 and SN 133 control the power flow between bus B1 142 and reactive elements 120, and between bus BN 143 and reactive elements 120, respectively. Moreover, as shown in FIG. 1, switch SGND 134 controls power flow between reactive elements 120 and ground.

Reactive elements 120 may be one or more components in which power may be supplied to (and stored) as well as taken from. For example, reactive elements 120 may be any combination of inductors, transformers or capacitors. The invention is not limited in this manner.

In accordance with the principles of the present invention, switches S0 131 to SN 133 may perform up to four functions. As explained in more detail below, these functions include charging reactive elements 120, providing synchronous rectification, discharging reactive elements 120 (to drop any stored charge), and providing power routing.

Moreover, although switches are shown to couple each of the power buses to the reactive elements in FIG. 1 and the figures to follow, other types of circuit components which are suitable for a particular application may be used. For example, assuming that power bus B1 142 in FIG. 1 is a unidirectional power port (i.e., it is only intended to either receive power from or transfer power to the reactive elements, but not both), a diode may be used in place of switch S1 132. Accordingly, the remaining power buses (using switches to coupled to the reactive elements) are able to transfer power bidirectionally with the reactive elements, but power bus B1 142, using only a single diode for coupling to the reactive elements, can only transfer power in one direction. The use of diodes for this purpose, however, can present problems for low voltage applications due to the voltage drops associated with the diodes. Accordingly, although diodes and other types of suitable components may be used, either alone or in combination (e.g., the use of multiple components to allow power flow in dual directions), the use of switches presents the simplest implementation of the present invention.

Controller 110 in FIG. 1 uses current measurements of reactive elements 120 to monitor the direction and magnitude of current flowing through reactive elements 120 (shown as Isense bus 111). Although a single bus is shown in FIG. 1, however, it should be understood that more than one current sense signal may be used by controller 110 (i.e., a separate sense signal associated with each or any number of power buses can be utilized by controller 110). Using Isense 111, controller 110 opens and closes switches S0-SN in order to change the flow of power among the various buses B0 141 through BN 143. In other words, controller 110 turns switches S0 131 through SN 133 and switch SGND 134 ON and OFF in order to either allow energy from one or more of buses B0 141 through BN 143 to be stored in reactive elements 120, or to transfer stored energy in reactive elements 120 to any combination one buses B0 141 through BN 143 or ground. The use of a controller such as described above enables bidirectionally power flow between two or more power components, and thus, is beneficial in circuits using a combined buck and boost topology, a flyback topology, or any other suitable circuit topology.

In one example, bus B0 141 can be a DC wall adapter, bus B1 142 can be a battery, and bus BN 143 can be a portable electronic device. It should be noted that although the use of a wall adapter results in external conversion of power from an AC power source to DC power, such conversion may be incorporated directly into the operation of a bidirectional power converter in accordance with the principles of the present invention. Accordingly, B0 141 can be an AC power source, in which case some type of rectification would be included within the bidirectional power converter utilizing the AC power source. In the example above, controller 110 may be a current-mode controller that uses multiple control loops in order to OPEN and CLOSE the switches, and thereby control the transferring of power among the buses. As explained in greater detail below, controller 110 controls the flow of power among the various buses by adjusting the magnitude and direction of current flow through reactive elements 120, from and to the various power buses in the circuit.

Additionally, it should be understood by those skilled in the art that not every switch shown in FIG. 1 must necessarily be used. Generally, when certain switches are not needed, they may be replaced by shorts. For example, switch SGND in FIG. 1 may be replaced with a short, depending on the arrangement of reactive elements 120.

Figure 2:
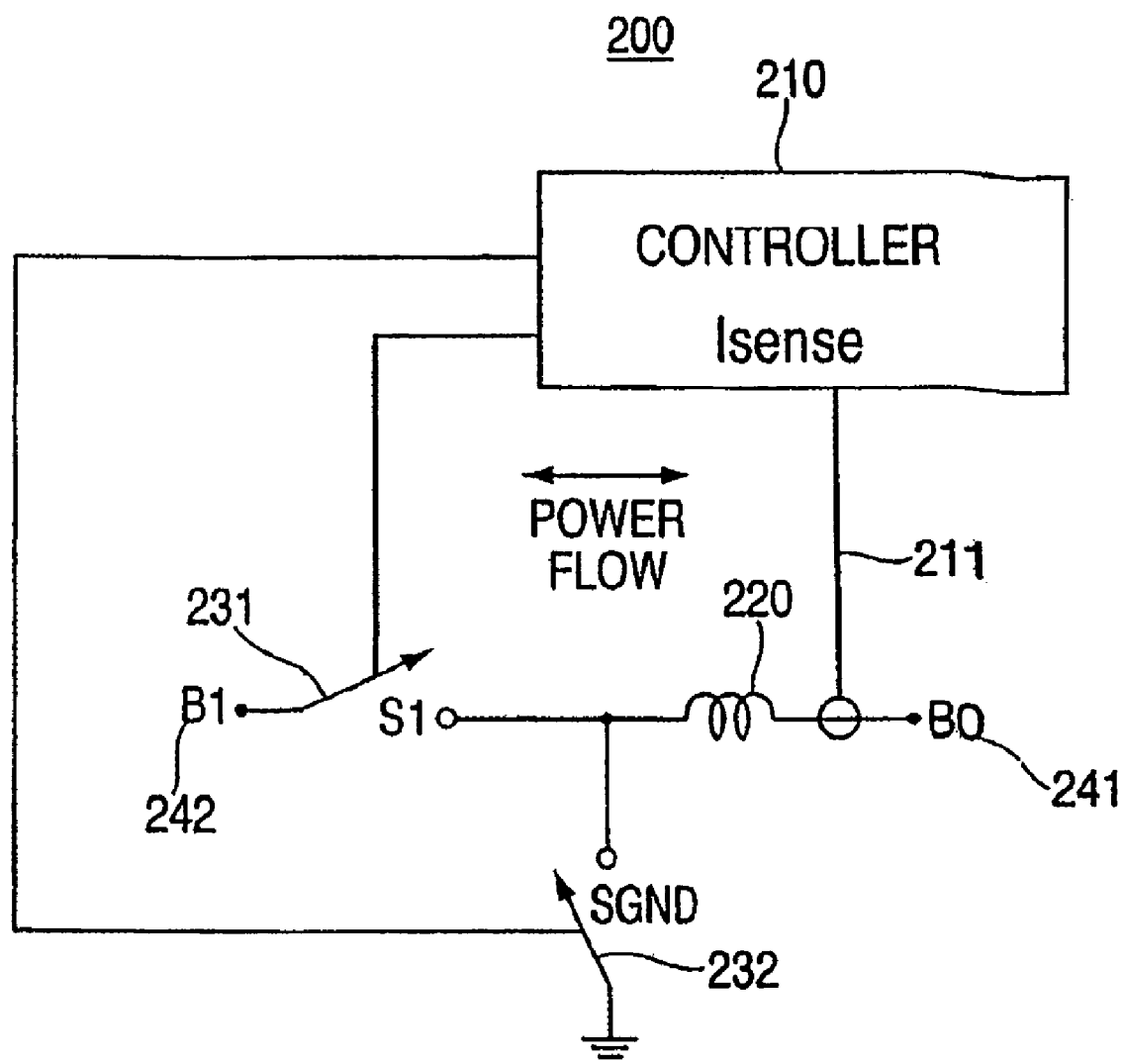
FIG. 2 is a circuit diagram of a bidirectional buck and boost converter in accordance with the principles of the present invention.

FIG. 2 shows a simplified bidirectional buck and boost converter in accordance with the principles of the present invention. Buck converters, also known as step-down converters, produce an output voltage that is smaller in magnitude than a supplied input voltage. On the other hand, boost converters, or step-up converters, provide an output voltage that is larger in magnitude than a supplied input voltage.

Circuit 200 includes controller 210, buses B0 241 and B1 242, switches S1 231 and SGND 232, and inductor 220. The circuit shown in FIG. 2 operates as a buck converter when passing power from bus B1 242 to bus B0 241, left to right. Alternatively, it functions as a boost converter when passing power from bus B0 241 to bus B1 242, right to left. Moreover, controller 210 controls switches S1 231 and SGND 232, and inductor 220 serves as the reactive element in which power may be stored and from which power may be taken.

In bidirectional converter 200, because only a simple inductor 220 is used as the reactive element, the device may be fabricated with relatively small size and high density. Moreover, bidirectional converter 200 works well for bus voltages V0<<V1 (V0 is the voltage at bus B0 241 and V1 is the voltage at bus B1 242). As V0 approaches V1, however, the duty factor required for operating as a boost converter may become a problem. This problem may be alleviated, as explained, below, through the use of a flyback transformer instead of inductor 220.

Similar to controller 110 of FIG. 1, controller 210 shown in FIG. 2 controls the switching that causes power transfer in converter 200. Additionally, the controller is once again a current-mode controller using multiple control loops in order to OPEN and CLOSE the switches, thereby controlling the direction of power flow.

Figure 3:
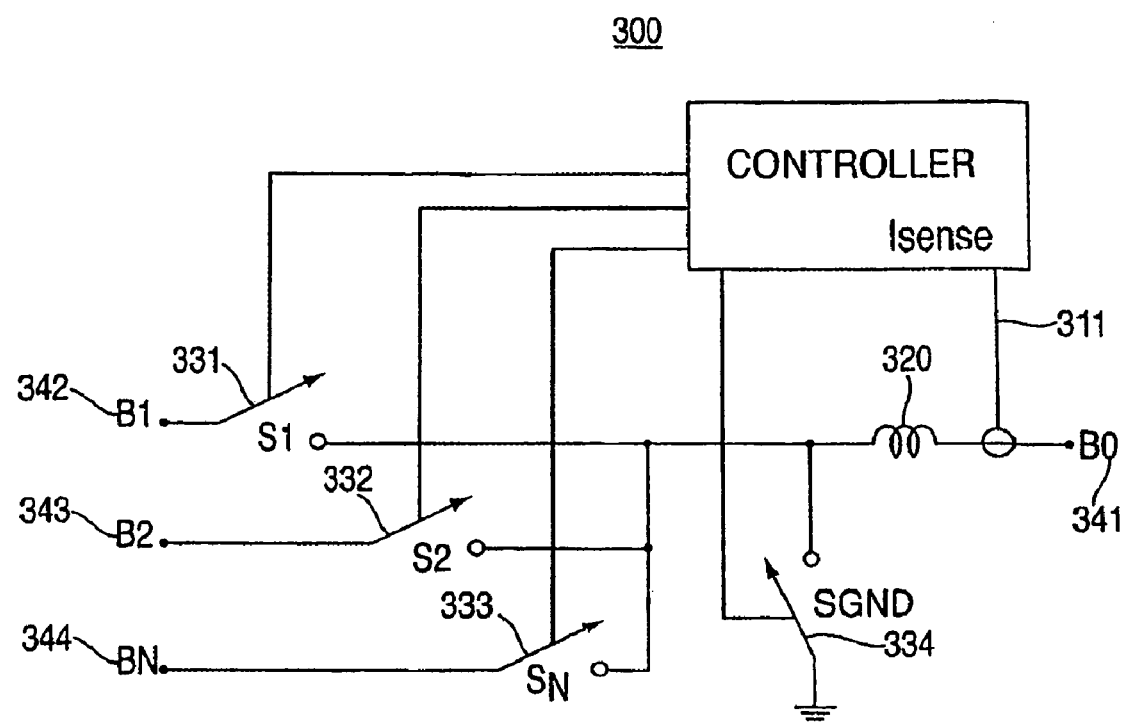
FIG. 3 is a circuit diagram of a bidirectional buck and boost converter with additional power buses in accordance with the principles of the present invention.

The circuit shown in FIG. 2 may also be expanded to include additional power buses. FIG. 3 shows a bidirectional buck and boost converter with additional buses in accordance with the principles of the present invention.

For the circuit shown in FIG. 3, it should be noted that Isense bus 311 may convey one or more sense signals to controller 310 (as explained above for the circuit shown in FIG. 1). It may be desirable, however, for Isense 311 to be a time multiplexed current sense signal which would be representative of the current that is individually supplied to any one of the power buses. This can be accomplished by providing for power transfer to or from only one of the power buses at any given time. Alternatively, separate sense signals can be used (one for each of the power buses) if power is being supplied from or delivered to more than one power bus at any given time.

In addition, persons of ordinary skill will appreciate that, assuming the normal voltage requirements for a buck or boost converter are met, bus B0 341 shown in FIG. 3 takes on special significance. This significance derives from the unvarying ability of bus B0 341 to take power from or pass power to any of the other buses in the circuit. This is a result of bus B0 341 being directly coupled to inductor 220, and therefore, not having a switch controlling its connection to inductor 220. Nevertheless, it remains possible to transfer power among the remaining buses. For example, bus B1 342 can provide power to, or take power from, any combination of buses B2 343 to BN 344. Additionally, bus B2 343 can provide power to, or take power from, bus B1 342 in addition to any of buses B3 (not shown) to BN 344. However, when power is being transferred among buses B1 342 to BN 344, bus B0 341 may absorb or provide additional power. For this reason, although the above mentioned and other bus power transfer combinations are possible, they should generally be avoided.

One manner in which the above power transfer combination problem can be avoided is to incorporate a switch between bus B0 341 and inductor 220. In this case, it is preferable to use a single-pole, double-throw switch. Furthermore, additional buses may be coupled to inductor 220 on the side coupled to bus B0 341 without departing from the scope of the invention, and these additional buses also may or may not be separated from inductor 220 by switches.

It should be appreciated by those skilled in the art that the bidirectional buck-boost converter shown in FIG. 2 and described above is a non-insulating converter. This type of converter is generally used in applications where voltage is only required to be stepped up or down by a relatively small amount, and in which it is acceptable for there not to exist electrical isolation between the input and output of the converter. In certain situations, however, it becomes desirable or even necessary to obtain isolation between the converter input and output. This isolation may be accomplished by removing the inductor and incorporating a transformer into the converter. Specifically, flyback converters are a version of buck-boost converters that incorporate transformer isolation while storing energy.

Figure 4:
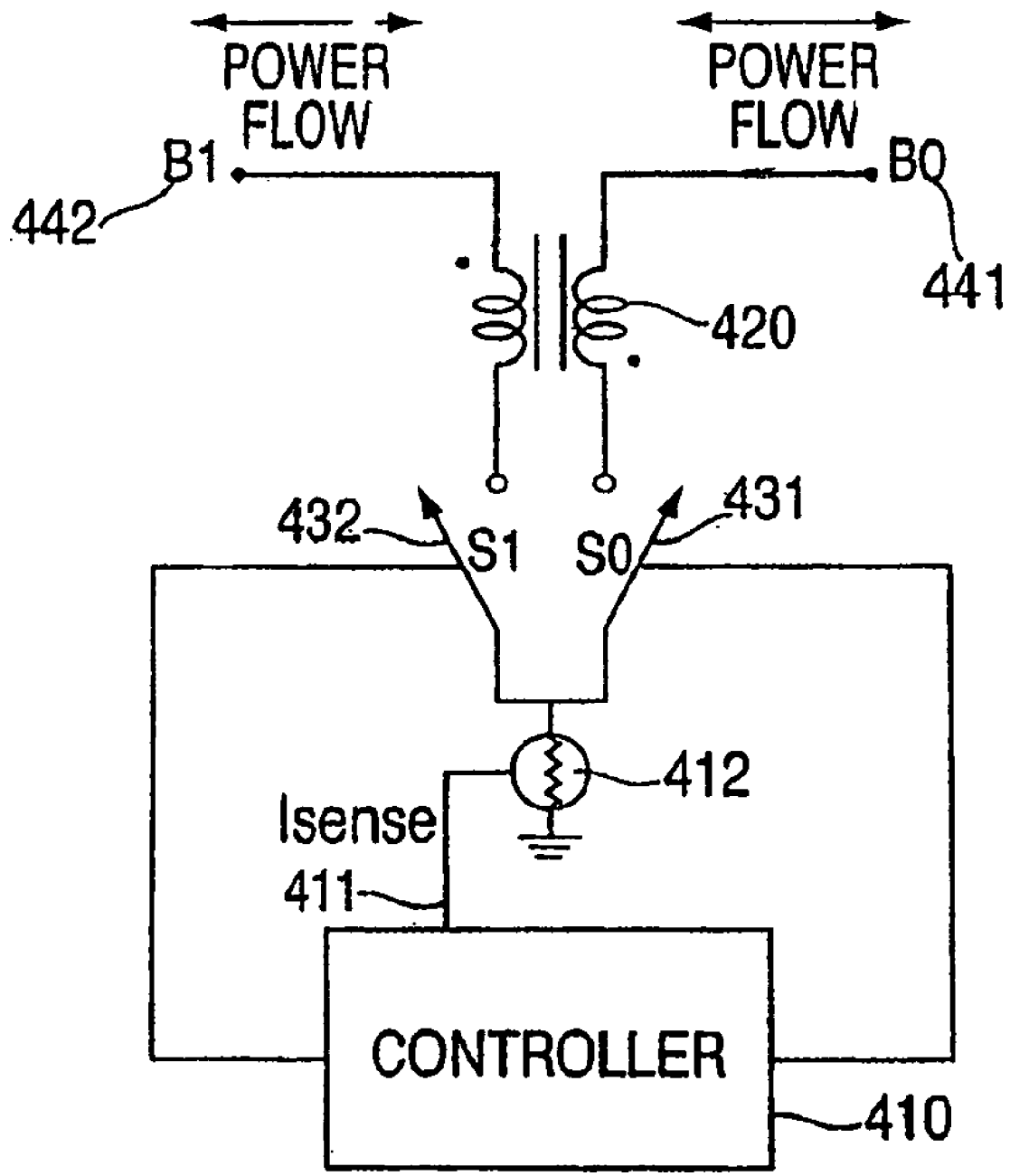
FIG. 4 is a circuit diagram of a bidirectional flyback converter in accordance with the principles of the present invention.

FIG. 4 shows a circuit diagram 400 of a bidirectional flyback converter in accordance with the principles of the present invention. Circuit 400 includes controller 410, flyback transformer 420, switches S0 431 and S1 432, and buses B0 441 and B1 442.

Although flyback transformer 420 of circuit 400 is represented using the same symbol as an ideal transformer, it is better described as a "two-winding inductor." Flyback transformers, unlike ideal transformers, do not allow current to flow simultaneously in both windings. Instead, the magnetizing inductance of a flyback transformer assumes the role of the inductor of the buck-boost converter, and the magnetizing current is switched between the primary and secondary windings.

Furthermore, low-side N-channel MOSFET switching, or ground-side switching, simplifies the switch driver design in circuit 400. In this case, the MOSFETs acting as switches have their respective gates connected to a controller, their drain terminals connected to the flyback transformer and their source terminals connected to ground via a sense circuit.

The main advantage of using N-channel MOSFETs results from the typically greater efficiency when compared to using a comparable on-resistance P-channel device (because less gate charge will be required for switching). Additionally, low-side switching with N-channel MOSFETs permits the use of MOSFETs with relatively low absolute maximum gate-source ratings, even in higher voltage applications. To further simplify the circuit design, common current sensing may be used to reduce the component count. For example, a sense resistor may be used, such as sense resistor 412 shown in FIG. 4. Alternatively, another suitable component may be used for this purpose.

An important consideration when dealing with converter 400 is the coupling coefficient of flyback transformer 420. The windings of a flyback transformer are said to be coupled when the are arranged in such a manner that a changing magnetic field created by one of the windings can induce a current in the other winding. Moreover, the coupling coefficient of transformer 420 indicates the degree of coupling between the windings, and should be made as high as possible (i.e., the coupling coefficient should be as close to one as possible).

The coupling coefficient of transformer 420 is dependent on the portion of the total flux lines that cuts both the primary and secondary windings. Preferably, all the flux lines generated by the primary winding should cut the secondary winding, and vice versa. Lines of flux generated by one winding that do not link with the secondary winding are referred to as leakage flux, and result in having a voltage induced in the secondary winding that is less than would otherwise occur under ideal conditions. For this reason, efficiency is reduced as a result of leakage, and spikes may result at the drain of the switching device.

Bifilar winding can be used to reduce leakage inductance and improve the magnetic coupling of the windings, and therefore, is often used when it is important to achieve a superior coupling coefficient and to improve overall efficiency. In this situation, a simple integer turns ratio may be desirable. Nevertheless, the turns ratio of the windings of flyback transformer 420 can be adjusted, although the resulting duty factor should be taken into consideration. Furthermore, particularly in low voltage applications, consideration should be given to selecting a transformer with low winding resistance in order to improve efficiency at heavier loads.

It should be understood that the ratio of V1 (the voltage at power bus B1 442) to V0 (the voltage at power bus B0 441) in FIG. 4 is independent on the turns ratio of the bifilar winding of flyback transformer 420. Accordingly, the ratio of V0 to V1, or any other combination of power buses shown in the figures described below, can be manipulated regardless of the turns ratio of flyback transformer 420.

A particular benefit of the bidirectional converter shown in FIG. 4 over the converters shown in FIGS. 2 and 3 is that converter 400 will maintain normal operation regardless of whether bus voltage V0 is greater or less than bus voltage V1. This can be important when either V0 or V1 originates from a battery, because some batteries (for example Lithium-Ion batteries) show large cell voltage variation as they discharge.

Figure 5:
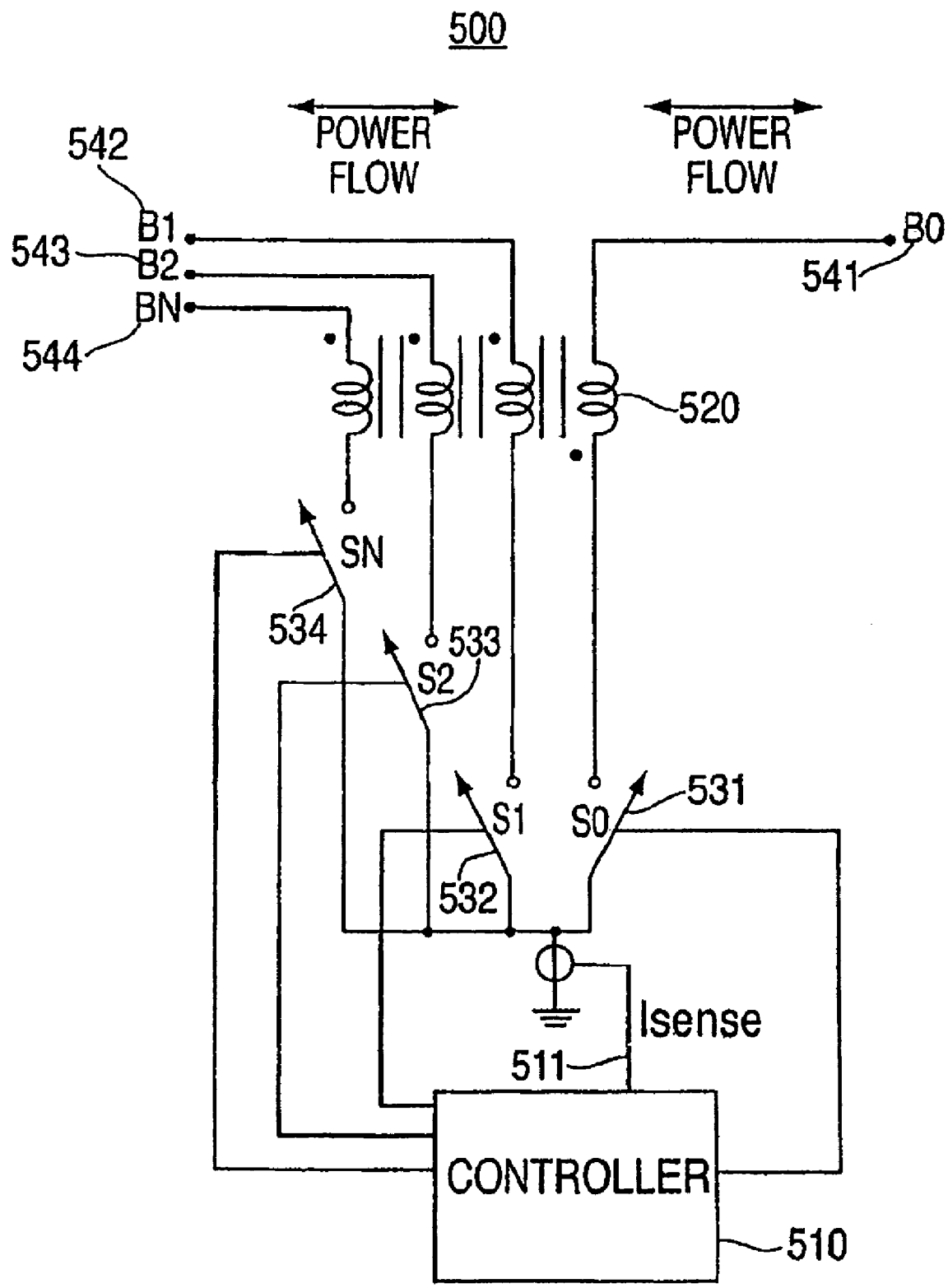
FIG. 5 is a circuit diagram of a bidirectional flyback converter with additional power buses in accordance with the principles of the present invention.

A similar flyback converter topology to that shown in FIG. 4 may also be used for applications involving the transfer of power among more than two components. Persons of ordinary skill in the art will appreciate that additional buses may be added to the converter of FIG. 4, as shown in FIG. 5. Circuit 500 is a circuit diagram of a bidirectional flyback converter with additional buses in accordance with the principles of the present invention. Circuit 500 includes controller 510, transformer 520, switches S0 531, S1 532, S2 533 and SN 534, and buses B0 541, B1 542, B2 543 and BN 544.

Additional DC connections are made to flyback transformer 520 by adding multiple secondary windings. As shown, on either side of each winding, a switch and its corresponding bus voltage is connected. A person skilled in the art will appreciate that the polarity dots on the transformer are correct in situations where the voltages on all buses have the same polarity, for example, V0-VN are all positive or V0-VN are all negative. Moreover, the preferred power transfer. combinations involve power transfer between bus B0 541 and the remainder of the buses, but in some instances other combinations are also acceptable. Once again, as with the circuits described above, Isense bus 511 may convey one or more sense signals to controller 510. Assuming that only one power bus is receiving power from or supplying power to flyback transformer 520, a single current sense signal can be used (where the sense signal is sampled at certain time intervals). Alternatively, multiple sense signals can be used when more than one power bus is receiving or supplying power at any given time.

It should be understood by those skilled in the art that each possible power flow combination of the aforementioned bidirectional power converters may have a unique application, unique power converter topology, unique demands on transient response and unique input and output voltages or currents. For example, a bidirectional flyback converter may be operating in one of two different modes, namely, discontinuous conduction mode or continuous conduction mode. In the former, all energy stored in the first winding during the ON (energy storing) time is completely delivered to the other winding and to the load before the next cycle, and there may also be dead time between the instant the secondary current reaches zero and the start of the next cycle. A circuit operating in discontinuous mode is typically designed to enter into continuous mode as the output current level is increased beyond a predetermined value. When continuous mode is entered into, there remains energy in the secondary winding at the beginning of the next cycle.

Figure 6:
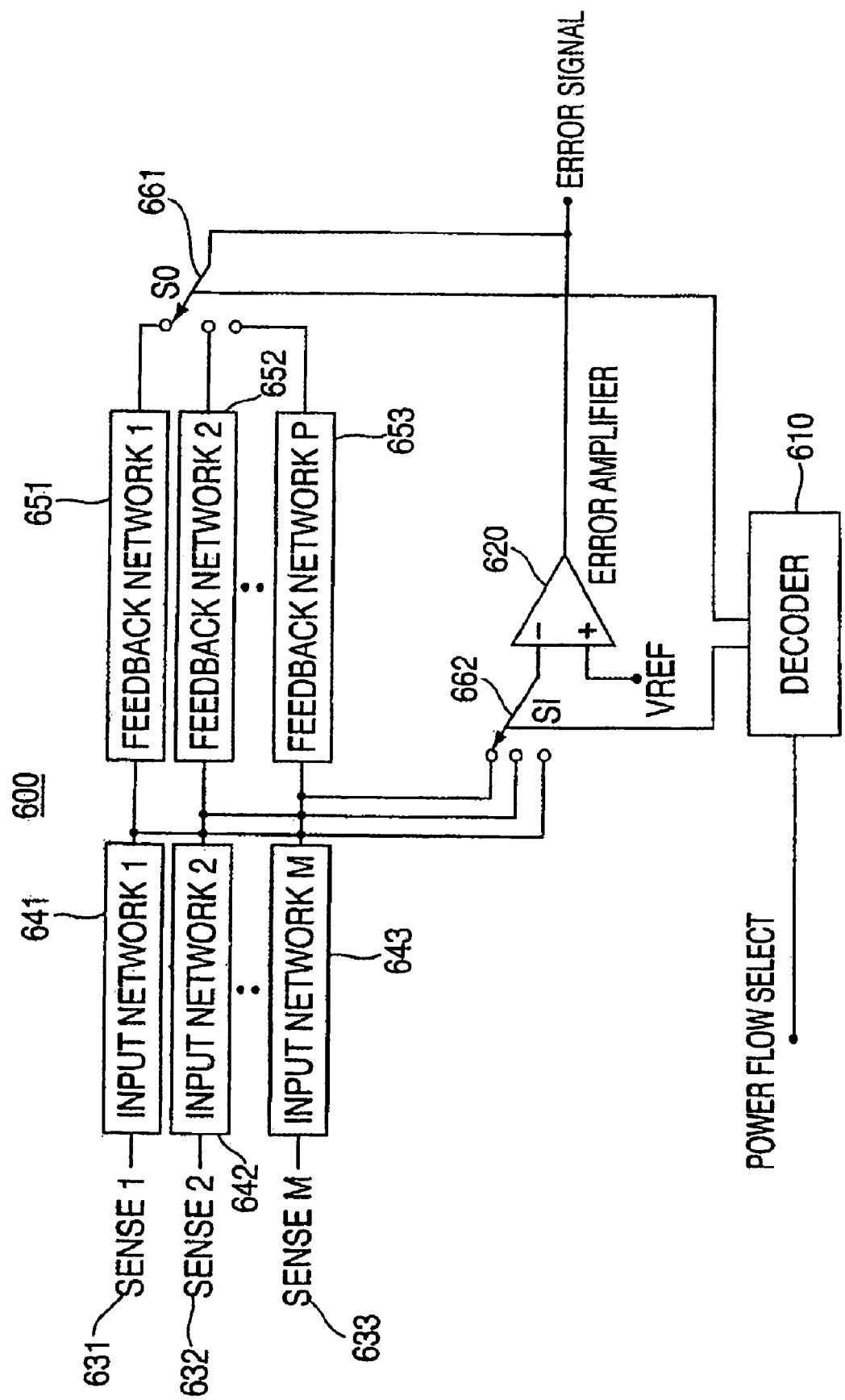
FIG. 6 is a circuit diagram of an error amplifier with sense signal and compensation selection in accordance with the principles of the present invention.

Furthermore, because of the many different requirements for different power flow combinations, each power transfer combination may require different feedback signals and compensation (examples of which are provided below), except that a sense current is typically required in order to determine the direction of current flow. FIG. 6 is a simplified circuit diagram of an error amplifier using a shared-amplifier arrangement with sense signal and compensation selection that may be used in a control circuit, as described below, in accordance with the principles of the present. In the examples provided below, current-mode controllers are used in determining the direction of power flow among the various power buses. The present invention is not limited in this respect, however, as voltage-mode controllers (or any other suitable type of controller or combination of controllers) that can use signals representative of average current flow may also be used to control the flow of power among various power buses in a bidirectional power converter.

Depending on the desired power flow combination (i.e., the source(s) of power and the destination(s) of the power being transferred), decoder 610 selects the sense signals and compensation (feedback network) needed. In the embodiments discussed below, a direction signal serves to select the appropriate sense signal and feedback network. Moreover, in accordance with the principles of the present invention, and as shown in FIG. 6, there may be up to M voltages or voltage representations of sensed currents in the power converter (shown as sense1 631 through senseM 633), in addition to up to P different feedback networks. It should be understood by those skilled in the art that any combination of sense signals may be used with any combination of feedback networks. Moreover, the complexity of this circuit can be traded off against the transient performance.

As shown in FIG. 6, switch S1 662 couples one of the sense signals to the inverting input of error amplifier 620 (depending on the selection by decoder 610). Decoder 610 also selects the appropriate feedback network by causing switch S0 661 to close a particular feedback loop (i.e., one of feedback networks 651 through 653). Accordingly, based on circuit conditions, decoder 610 control switches S1 662 and S0 661 in order to produce an error signal (to be used in a manner described below).

Figure 7:
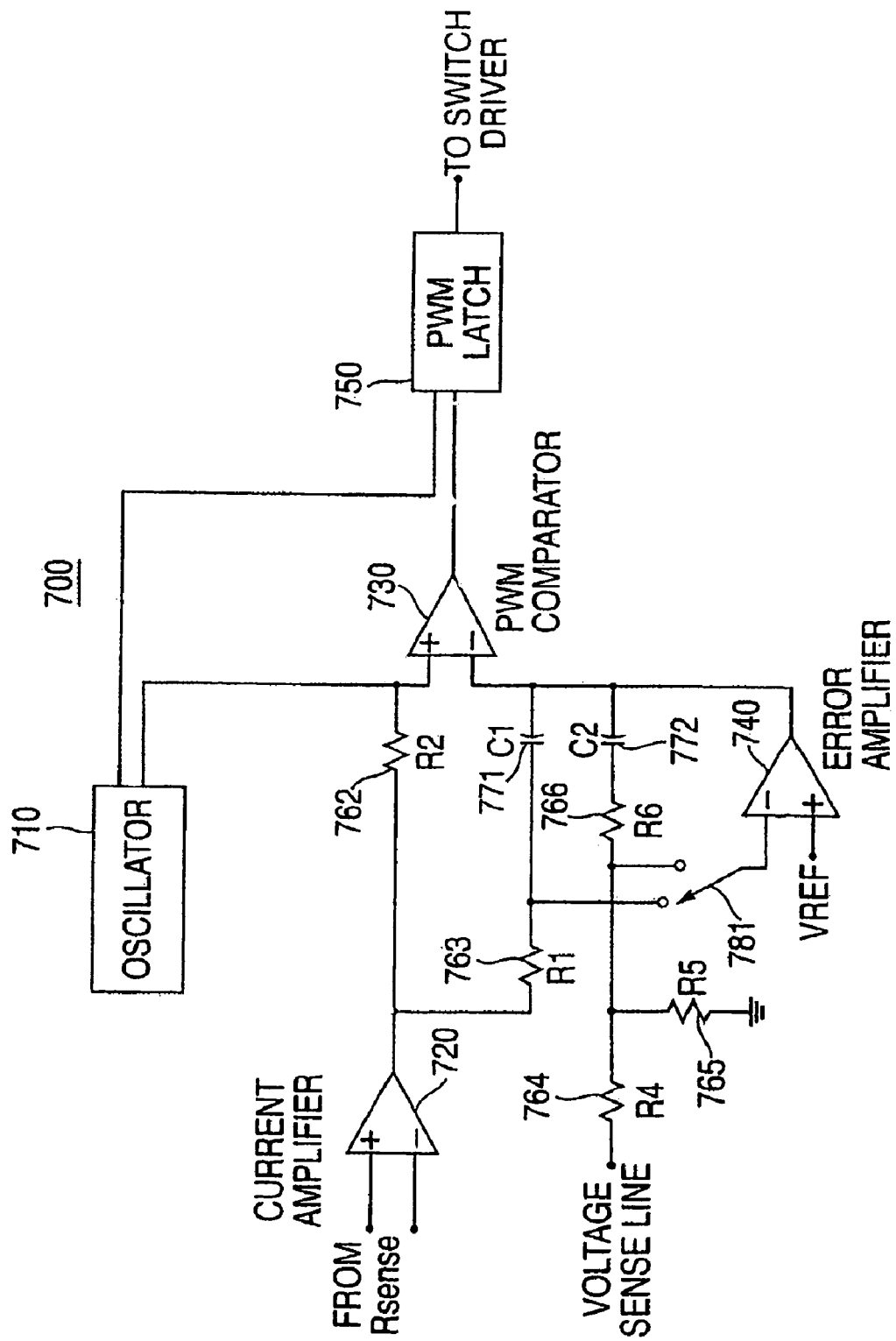
FIG. 7 is a circuit diagram of a portion of a controller for a current-mode bidirectional power circuit in accordance with the principles of the present invention.

FIG. 7 shows an embodiment of a portion of a controller, or control circuit, to be used in the control circuits for FIGS. 8-9 described below. The circuit shown in FIG. 7 uses the principles explained above for FIG. 6, and may be used by a bidirectional power converter having particular sense signals and feedback networks in place (as shown). Optional current amplifier 720 takes the voltage potential across a current sense resistor and adjusts and (potentially). creates an offset signal as required.

When a converter using the circuit shown in FIG. 7, such as those shown in FIGS. 8-9 and described below, is operating as a charger, switch 781 is controlled in such as manner that error amplifier 740 uses the signal provided by amplifier 720 (which is supplied through an input network comprising resistor 763) and uses a feedback network comprising capacitor C1 771. In this manner, when the circuit of FIG. 7 is being used by a converter that is operating as a charger, error amplifier 740 acts as an integrator with the signal and feedback network described above.

Alternatively, when the converter using circuit 700 is operating as a regulator, error amplifier 740 uses the signal provided by the voltage sense line (supplied through an input network comprising a voltage divider made up of resistors R4 764 and R5 765) and uses a feedback network comprising resistor R6 766 and capacitor C2 772. In this manner, when circuit 700 is being used by a converter operating as a regulator, error amplifier 740 acts as an integrator with zero with the signal and feedback network described above. Using an integrator with zero configuration when the converter is operating as a regulator, as opposed to a simple integrator configuration as in the case above when the converter is operating as a charger, provides a faster transient response. Although having a faster transient response is particularly important when the converter is operating as a regulator as opposed to a battery charger, the integrator with zero configuration (or another suitable configuration) may be used in all modes of operation of the converter.

Moreover, for purposes of simplification, it is assumed that in circuit 700, error amplifier 740 can drive both feedback networks (i.e., the integrator and integrator with zero feedback networks). Thus, an output selection switch is not necessary as shown in FIG. 6 (see component S0 661 and the description provided above), and only input switch S1 781 is used. The present invention is not limited in this respect, and it should be understood by those skilled in the art that an output selection switch (to select an appropriate feedback network) may be implemented with minimal effort.

Oscillator 710, current amplifier 720, pulse-width modulation (PWM) comparator 730 (which receives a current ramp from oscillator 710) and PWM latch 750 provide the remaining components for circuit 700. A driver, not shown in FIG. 7, maintains a connection from circuit 700 and uses a zero current comparator for synchronous rectifier operation and logic to route and buffer the output of the PWM latch to the switches. The driver may also include anti-cross-conduction circuitry, logic inversions, and other logic functions.

Figure 8:
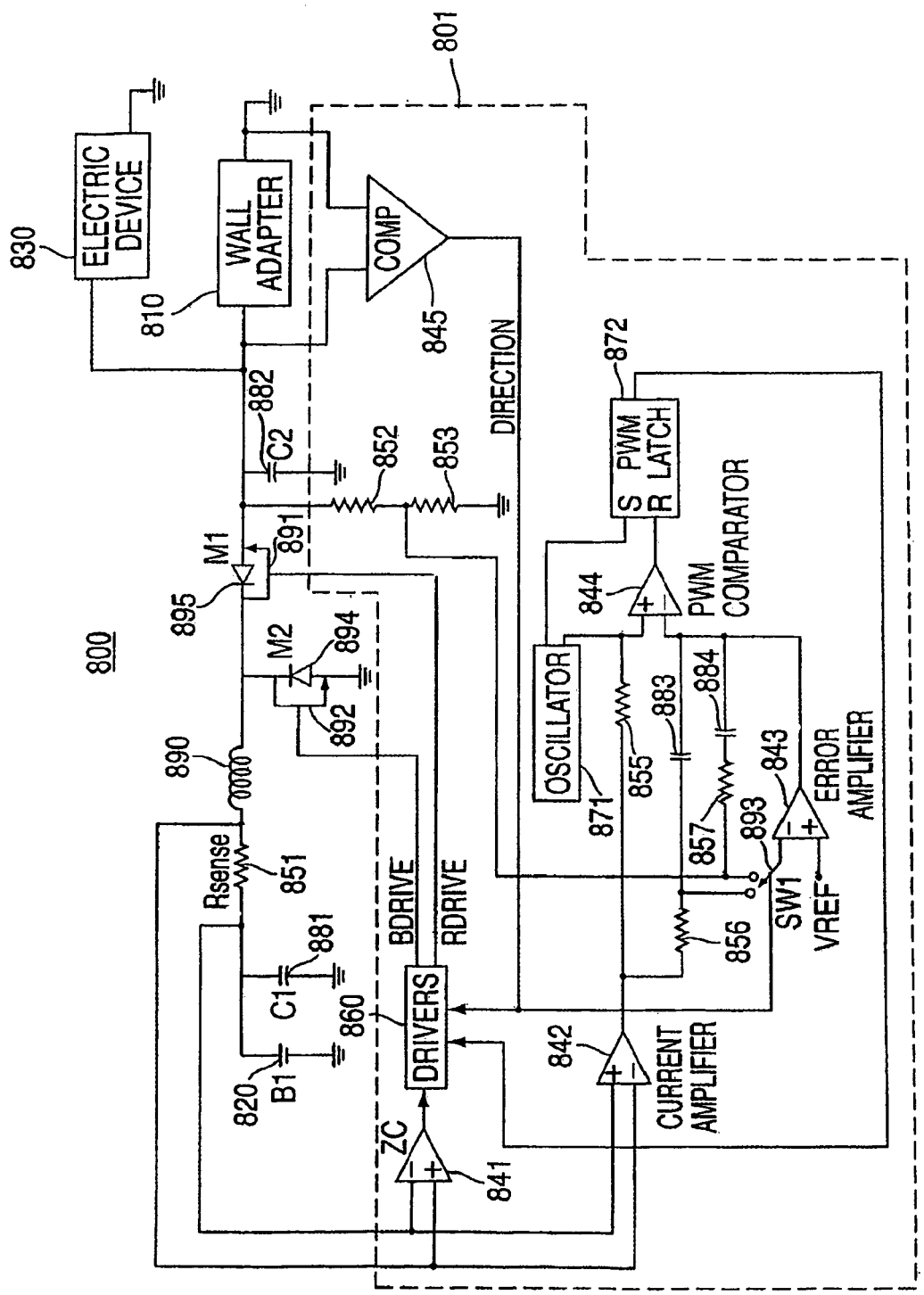
FIG. 8 is a circuit diagram of a preferred embodiment of a simplified current-mode buck battery charger and boost regulator power circuit in accordance with the principles of the present invention.

FIG. 8 shows a circuit diagram of a simplified current-mode buck battery charger and boost regulator power circuit used to power an electronic device in accordance with the principles of the present invention.

The circuit of FIG. 8 uses control circuit 801 (comprising the components of circuit 700) to control the transfer of power among the various power buses (i.e., wall adapter 810, electronic device 830 and battery 820). When wall adapter 810 is providing ample power and maintains a connection with the circuit, it provides electric device 830 with power, and rechargeable battery 820 is charged by the buck charger comprising inductor 890, switch S1 891 and switch SGND 892. (capacitors C1 881 and C2 882 are included for filtering and to reduce electromagnetic interference). If wall adapter 810 is either disconnected from the circuit, not supplying adequate power, or turned OFF (i.e. not supplying any power), power is taken from battery 820 and supplied to electronic device 830 by the boost converter formed by the same power devices as before (switches S1 891 and SGND 892, along with inductor 890). The interconnection of components is not altered when the circuit changes its operation between buck and boost modes, but the power flow reverses direction because the error signal from RSENSE 851 causes control circuit 801 to operate switches S1 891 and SGND 892 in such a manner that enables this to happen.

Control circuit 801 operates in the following manner. If the circuit in FIG. 8 is operating as a battery charger, control circuit 801 measures the average voltage drop across RSENSE 851 during the battery charging phase of the power converter in order to control the charging of battery 820. On the other hand, if circuit 800 is operating as a regulator (power taken from battery 820 and supplied to electronic device 830), control circuit 801 uses the voltage divider comprising resistors 852 and 853 to control the regulation of the voltage being supplied to electronic device 830.

The direction signal emerging from direction comparator 845, which measures the ability of wall adapter 810 to supply power, is fed into driver 860. Additionally, the direction signal controls switch SW1 893, thereby selecting the input network and feedback network to be used by error amplifier 843 in receiving the sense signal. As explained above, an separate output switch is not necessary to select the appropriate feedback network, but may easily be implemented. Moreover, for battery charging, SW1 893 preferably ensures that error amplifier 843 acts as an integrator (i.e., the feedback network includes a capacitor), while during voltage regulation it preferably ensures that error amplifier 843 acts as an integrator with zero (i.e., the feedback network includes a resistor in series with a capacitor), resulting in a faster transient response.

At the beginning of each oscillator cycle, PWM latch 872 is set. Depending on the desired direction of power flow, the appropriate switch is turned on. The remaining components that make up control circuit 801 for this converter ensure that the current flowing through inductor 890 remains below a predetermined level while power is being transferred among the circuit components.

A consideration relating to compensation in converter 800 is that the poles and zeros of the power circuit are different for the circuit when operated as a buck converter as opposed to a boost converter, the result being that the circuit shown in FIG. 8 has a different power circuit transfer function when operating in different modes. For example, there is no right half plane zero in the circuit transfer function when converter 800 is operating as a buck converter in continuous conduction mode, but there is a right half plane zero in the circuit transfer function when it is operating as a boost converter. This change should therefore be taken into consideration in order to enable optimal performance of converter 800 depending on the application, for example, by changing the location of the poles and zeros of the circuit transfer function. Changing the poles and zeros may be implemented by customizing the various circuit components (e.g., changing the components associated with error amplifier 843). Accordingly, consideration can be given to the fact that converter 800 has the potential for considerably better transient response when operating as a buck converter as opposed to operating as a boost converter. Moreover, load and line transient response, as previously mentioned, typically needs to be much quicker when circuit 800 is operating as a regulator rather than when operating as a battery charger.

Figure 9:
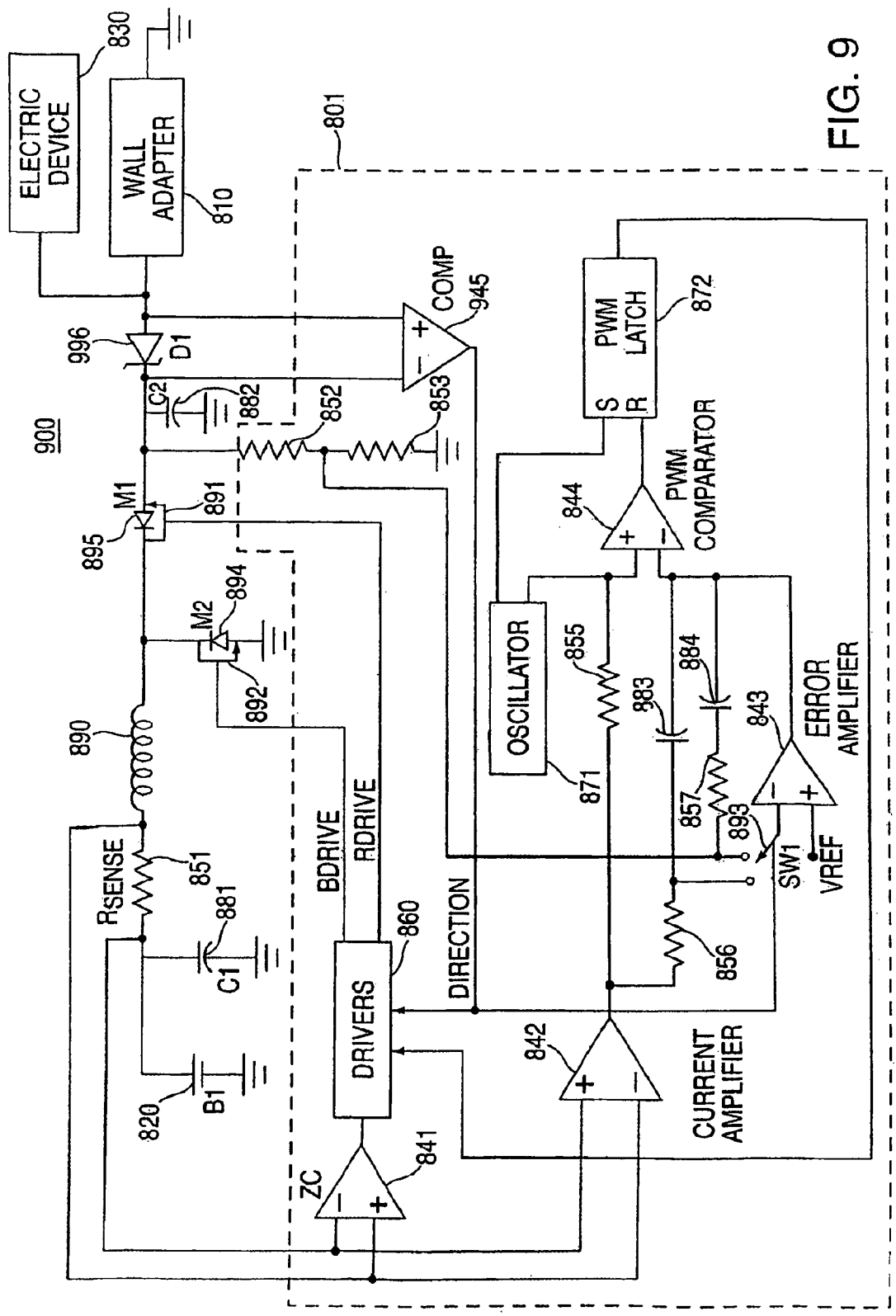
FIG. 9 is a circuit diagram of another embodiment of a simplified current-mode buck battery charger and boost regulator power circuit with the principles of the present invention.

FIG. 9 shows another embodiment of a simplified current-mode buck battery charger and boost regulator power circuit used to power an electronic device. The bidirectional power converter shown in FIG. 9 is substantially identical to the one in FIG. 8, except that direction comparator 845 is replaced with direction comparator 945, and a diode 996 is added for the purpose of allowing direction comparator 945 to detect whether or not wall adapter 810 is supplying power to the circuitry. Accordingly, instead of taking a direct measurement of the power being supplied (or lack thereof) from wall adapter 810 as in the circuit of FIG. 8, direction comparator 945 in FIG. 9 provides a signal indicative of the voltage drop across diode D1 996 for the purpose of determining the available power from wall adapter 810. In this manner, the power source is chosen (either wall adapter 810 or battery B1 820) in order to deliver the necessary power to the remaining components.

Figure 10:
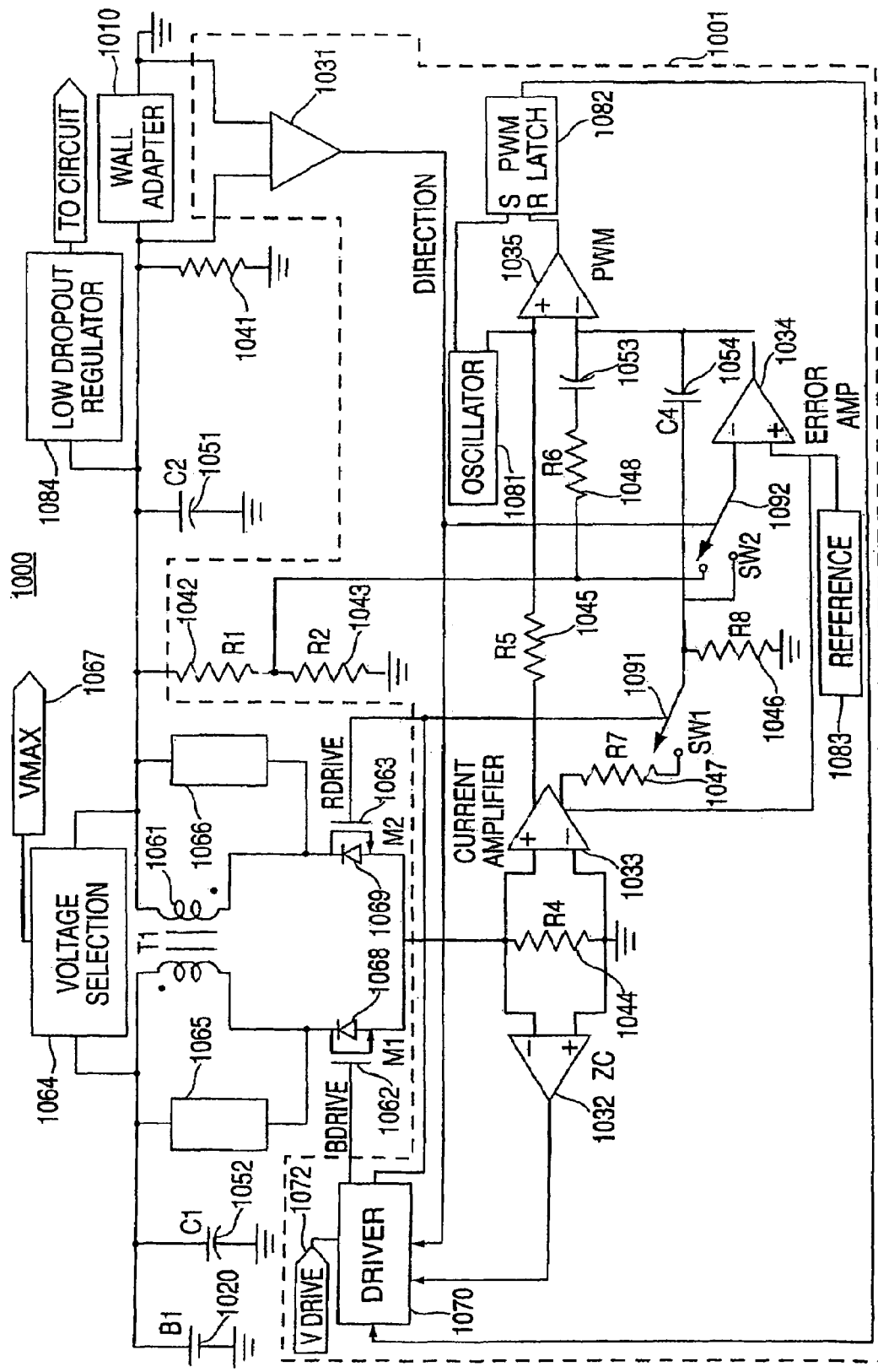
FIG. 10 is a circuit diagram of a preferred embodiment of a simplified bidirectional flyback converter in accordance with the principles of the present invention.

FIG. 10 shows a circuit diagram of a simplified bidirectional flyback converter for positive supply regulation and battery charging in accordance with the principles of the present invention. As in the circuits shown in FIGS. 8-9, converter 1000 includes a control circuit 1001 that uses a current feedback signal. Moreover, the embodiment shown in FIG. 10 works especially well for the latest generation of MOSFETs that have low absolute maximum gate-source voltages (usually less than the maximum drain source voltages). Additionally, gate-source voltage limiting may be accomplished via ground-referenced regulation of the gate drive supply voltage.

In circuit 1000, voltage selection network 1064 selects the power source as either battery B1 1020 or wall adapter 1010 based on the voltages available and creates an output voltage for all the remaining devices. One typical scheme uses the voltage of the two available voltages that is greater in magnitude to create voltage VMAX 1067. Another technique would be to take the lower of the two available voltages from battery B1 1020 and wall adapter 1010, as long as it exceeds the minimum voltage needed by the remaining devices. This technique may provide added efficiency but also increases the complexity of voltage selection network 1064.

VDRIVE 1072 is an optional regulated voltage linearly regulated down from VMAX 1076 which may be needed when power MOSFETs M1 1062 and M2 1063 have low absolute maximum gate-source voltages. In low voltage applications, Schottky diodes 1068 and 1069 are placed in parallel (as shown in FIG. 10) with the drain and source of the respective MOSFETs in order to prevent the body diode from turning on. This configuration preferably improves efficiency by helping to eliminate losses due to reverse recovery in these body diodes and forward voltage drops during the break interval. Additionally, snubbers SN1 1065 and SN2 1066, which are generally series RC (i.e., resistive-conductive) snubbers, keep the drain-source voltages of transistors M1 1062 and M2 1063 within acceptable limits. Moreover, bifilar winding (as previously described) in flyback transformer 1061 may be used to reduce the need for aggressive snubber design.

It should be understood by those skilled in the art that a regulated wall adapter may be used in place of unregulated wall adapter 1010, thereby eliminating the necessity for low dropout regulator 1084. In that case, the output to the circuitry and other devices (e.g., a portable electronic device) could be taken. directly across capacitor C2 1051 shown in FIG. 10. The invention is not limited in this manner.

During the operation of power converter 1000, the direction signal emerging from comparator 1031 determines whether converter 1000 operates as a battery charger or voltage regulator. Based on this direction signal, switch SW2 1092 selects the appropriate sense signal, input network, and feedback network for error amplifier 1034 for either battery charge current control, or regulator output voltage control. Once again, an output switch is not used to select the appropriate feedback signal, but the present invention is not limited in this respect. The direction signal originating from comparator 1031 also feeds driver 1070 and determines whether M1 1062 charges (stores energy in) transformer T1 1061 and M2 1063 discharges T1 1061, or whether these roles for M1 1062 and M2 1063 are reversed.

During battery charging, switch SW2 1092 is in the down position, and resistors R7 1047 and R8 1046, along with capacitor C4 1054, create a simple integrator with error amplifier 1034 and also set up nominal charge current. At the start of the oscillator cycle, PWM latch 1082 is set, causing M2 1063 to turn on. When the switch current reaches a predetermined level, as set by the control voltage at the output of error amplifier 1034, M2 1063 turns off and M1 1062 turns on. Additionally, when transistor M2 1063 is off and a battery charging current is flowing through resistor R4 1044, switch SW1 1099 samples the current sense signal. In this case, battery charging current can flow either through the body diode or from drain to source of transistor M1 1062. For this reason, RDRIVE is the signal to use for observing the charging current.

When circuit 1000 is being used for voltage regulation (i.e., power is being supplied by the battery), switch SW2 1092 is in the up position and resistor R6 1048 and capacitor C3 1053 create an integrator with zero with error amplifier 1034, while resistors R1 1042 and R2 1043 set up the nominal output voltage of the regulator to be compared with voltage reference level 1083.

During voltage regulation, M1 1062 turns on at the start of each oscillator cycle. Moreover, when the transformer current reaches a predetermined level as set by the output of error amplifier 1034, M1 1062 turns off and M2 1063 turns on. Current amplifier 1033 increases the amplitude of the current sense signal (observed as a voltage drop across resistor R4 1044) while rejecting noise arising from M1 1062 and M2 1063 gate charge, switching transients from primary and secondary currents of transformer T1 1061, common-mode noise potentially from other circuits, and ringing that may result from imperfect coupling between transformer windings. As shown in FIG. 10, the common mode voltage level is supplied by voltage reference level 1083, and the two output terminals of current amplifier 1033 which connect to resistors R5 1045 and R7 1047 provide complementary signals. Additionally, amplifier U6 1033 may also include blanking synchronized to the gate drive signals and/or bandwidth limiting.

When transformer T1 1061 has fully dumped its energy, the MOSFET that was serving as the synchronous rectifier may be shut OFF. This is accomplished through the use of zero current comparator 1032, which shuts OFF either M1 1062 or M2 1063 at the appropriate time. This is commonly done when power converter 1000 is expected to enter discontinuous conduction at light loading in order to improve the efficiency at lighter loads.

Comparator 1035 serves as a PWM comparator for peak-current mode control power converter 1000. Oscillator 1081 triggers the start of a power conversion cycle by setting PWM latch 1082 (driving Q high), assuming the reset-dominant input of PWM latch 1082 is not high. This causes the MOSFET (either M1 1062 or M2 1063 depending on the direction of power transfer) to turn on, thereby charging transformer T1 1061. As the energy stored in transformer T1 1061 increases, the current through sense resistor R4 1044 also increases, and, therefore, the voltage at the non-inverting input of PWM comparator 1035 also increases. When the voltage at the non-inverting input of PWM comparator 1035 exceeds the voltage on the inverting input, the output of PWM comparator 1035 goes high, resetting PWM latch 1082. As a result, the MOSFET that was charging transformer T1 1061 is turned off. In addition, it should be noted that oscillator 1081 provides PWM comparator 1035 a ramp current (similar to oscillator 710 described above). However, a voltage ramp could also be used with minor circuit modifications. The same is true for each of the bidirectional power converter circuits described in accordance with the principles of the present invention.

At this point, neither of MOSFETs M1 1062 or M2 1063 are turned on, and transformer T1 1061 begins to discharge through the body diode of the opposite MOSFET. This is a result of the flyback action and polarity of the windings of the transformer. After the break time (i.e., the time that MOSFETs M1 1062 and M2 1063 are off) has elapsed, the opposite MOSFET turns on connecting transformer T1 1061 to the load side of the circuit. If at any time during this part of the power conversion cycle the inductor current reaches zero, zero current comparator 1032 shuts off the MOSFET that was connecting transformer T1 1061 to the load side of the circuit. The circuit then waits for oscillator 1081 to provide a pulse to the S input of PWM latch 1082. When this pulse is provided to the S input of PWM latch 1082, another complete power conversion cycle begins.

Capacitors C1 1052 and C2 1051 are included at least for the purpose of filtering the current pulses. from the power converter, reducing electromagnetic interference, ripple voltage, and ripple current. Moreover, the sizing of capacitors C1 1052 and C2 1051, which preferably have low effective series resistance and inductance, should be selected depending on desired circuit characteristics (e.g., ripple voltage amount).

It should be noted that transformer saturation, which typically can occur at high output currents and extreme duty cycles, should be avoided under all operating conditions and combinations. In addition, although not shown, duty cycle limiting and pulse skipping at light loading is generally recommended for this topology. For example, Burst Mode™ of operation (hereinafter, "Burst Mode") may be entered into in order to provide higher operating efficiency. Examples of regulators that use Burst. Mode are Linear Technology Corp.'s 1435 and 1735 series products.

When operating in Burst Mode, the power MOSFETs operate intermittently at light loads, thereby increasing efficiency by minimizing switching losses. A Burst comparator may be used to determine when Burst Mode should be enabled, during which time the MOSFETs are not switched according to their normal cycles. It also determines when Burst Mode should be disabled, at which time normal circuit operation is resumed. Due to the introduction of broadband noise during Burst Mode operation, in particular during battery charging, it may be desirable to use normal operation.

Figure 11:
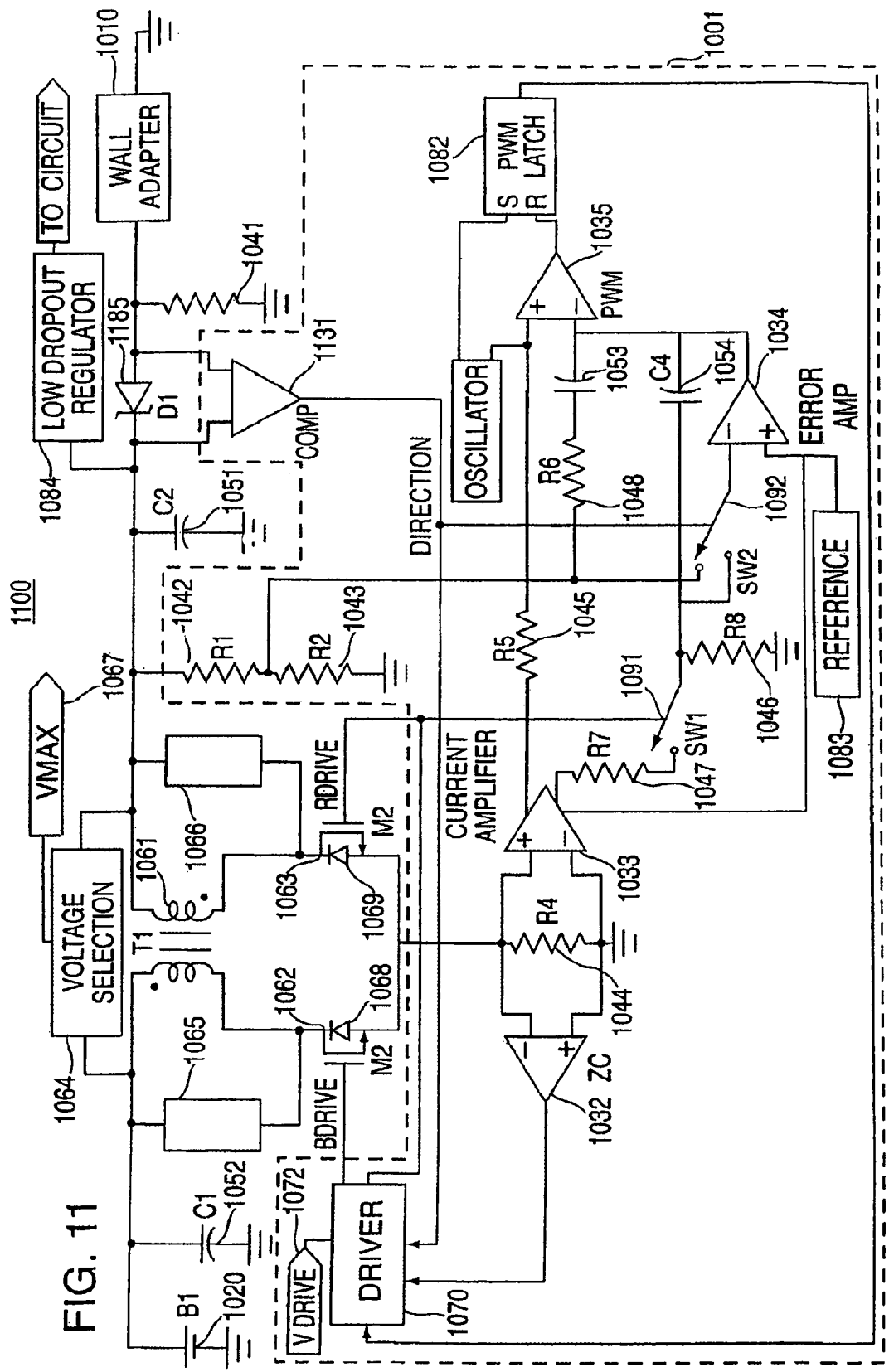
FIG. 11 is a circuit diagram of another embodiment of a simplified flyback converter in accordance with the principles of the present invention.

FIG. 11 shows a circuit diagram of another embodiment of a simplified bidirectional flyback converter for positive supply regulation and battery charging in accordance with the principles of the present invention. The bidirectional power converter shown in FIG. 11 is substantially identical to the converter of FIG. 10, except that direction comparator 1031 is replaced with direction comparator 1131, and a diode 1185 is added for the purpose of allowing direction comparator 1031 to detect whether or not wall adapter 1010 is supplying power to the circuitry.

In bidirectional converter 1100, direction comparator 1131 determines if a wall adapter is connected and operating (i.e., supplying sufficient power) by sensing the voltage drop across diode D1 1185. This requires the voltage supplied by wall adapter 1010 to be several hundred millivolts higher (at room temperature) than the voltage the bidirectional converter supplies in order to adequately forward bias diode. D1 1185. This reduces net efficiency (wall adapter to battery) slightly.

Smaller differential voltages (wall adapter to circuit) may be used to sense a powered wall adapter by using resistive wall adapter detection. This is accomplished by replacing diode D1 1185 with a current sense resistor (not shown).

There are, however, several disadvantages to using resistive wall adapter detection. First, the drop across the current sense resistor would vary with the current supplied by wall adapter 1010. Although in a current-limited battery charger this may not be a problem until the float voltage is reached, the drop in the sense resistor nonetheless should be carefully chosen. Second, offset in wall adapter detection comparator 1031 would become more critical, as would the common mode rejection ratio, filtering, and circuit layout (Kelvin connections to the current sense resistor, etc.) Third, R3 1041 would load the power converter when power is being supplied by battery 1020, and thus, resistor R3 1041 would have to be made relatively large in order for it not to impact the efficiency of the converter. One possible solution to this problem is to replace R3 1041 with R1 1042 and R2 1043 by moving R1 1042 and R2 1043 to the right of the current sense resistor (and eliminating R3 1041). Alternatively, the diode-based wall adapter detection circuit shown in FIG. 11, combined with an inexpensive unregulated wall adapter 1010, provides a simple and cost-effective design.

Figure 12:
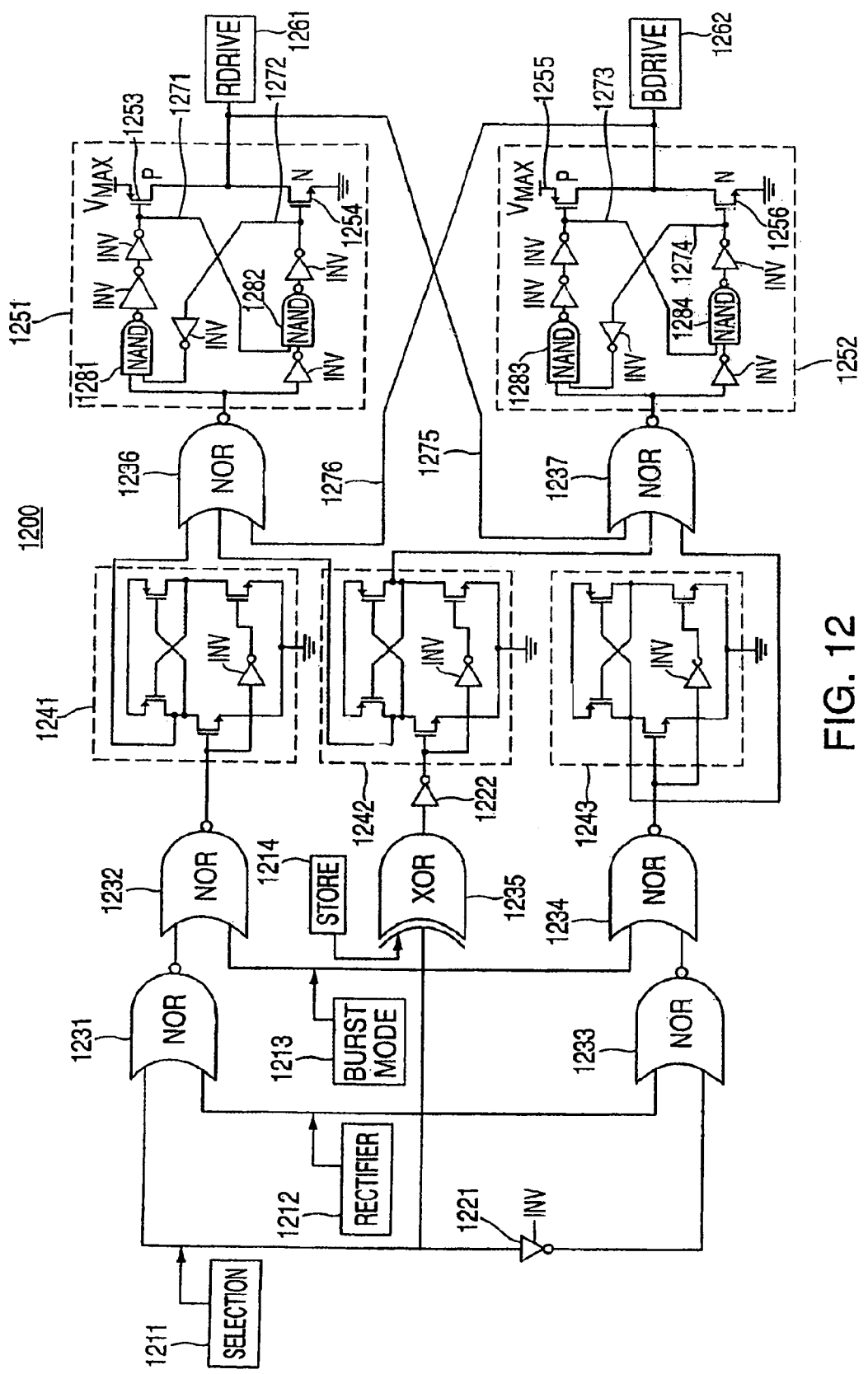
FIG. 12 is a circuit diagram of a driver circuit used to control power transfer in a bidirectional power converter in accordance with the principles of the present invention.

FIG. 12 shows a circuit diagram of a particular embodiment of driver circuitry that may be used in accordance with the principles of the present invention. Driver circuitry 1200 may be used, for example, in bidirectional power converters such as shown in FIGS. 8-11 and described above.

The one embodiment of driver circuitry, like driver circuitry 1200, corresponds to component 860 in FIGS. 8-9 and component 1070 in FIGS. 10-11. Driver circuitry 1200 includes a plurality of NOR gates (components 1231-1234 and 1236-1237), XOR gate 1235, level shifter circuits 1241-1243, buffers 1251-1252 and inverters 1221 and 1222 interconnected as shown in FIG. 12. Driver circuitry 1200 provides the regulator side and battery side switches of the regulators shown in FIGS. 8-11 with controlling signals RDRIVE 1261 and BDRIVE 1262, respectively, which are the signals that control the direction of power flow in the bidirectional power converters.

Identical circuits 1251 and 1252 in FIG. 1200, along with NOR gates 1236 and 1237, provide two levels of anti-cross conduction circuitry. These circuits are used to ensure that the controlling signals, RDRIVE 1261 and BDRIVE 1262, do not allow the external power switches which they are controlling (e.g., switches 1068 and 1069 in FIG. 10) to be ON at the same time. Accordingly, when either the regulator side switches or the battery side switches of the bidirectional converters described above are made to turn ON, the other switch is made to turn OFF.

For each of circuits 1251 and 1252, the components therein are configured such that the two internal MOSFETs are precluded from being simultaneously ON. This is accomplished in circuit 1251 through the use of feedback signals 1271 and 1272, which respectively drive NAND gates 1282 and 1281. Similarly, in circuit 1252, feedback signals 1273 and 1274 drive NAND gates 1284 and 1283, respectively. Accordingly, in circuit 1251, N-channel MOSFET 1254 does not turn ON before P-channel MOSFET 1255 has turned OFF, and vice versa. The same situation is present for internal MOSFETs 1255 and 1256 of circuit 1252. Moreover, feedback signals 1275 and 1276, which drive NOR gates 1237 and 1236, respectively, are. responsible for preventing RDRIVE 1261 and BDRIVE 1262 from turning the external power MOSFETs ON at the same time.

Level shifter circuits 1241-1243 shown in FIG. 1200 are cross-coupled level shifters that are used to translate inter-logic signals at a lower voltage level to a higher voltage level (as necessary to drive the regulator and battery-side MOSFETs). The purpose of these cross-coupled level shifters is to keep the voltages low until it is required that the voltages be raised in order to drive the regulator and battery-side MOSFETS.

Moreover, the circuit shown in FIG. 12 has four significant inputs (not shown in previous figures) that allow driver 1200 to provide signals RDRIVE 1261 and BDRIVE 1262 in order to control the switches of the bidirectional power converter as desired. Depending on circuit conditions, these inputs are used by driver circuitry 1200 to control the regulator and battery-side MOSFETs. Accordingly, these four inputs control whether power is transferred either from right to left (when the converter is acting as a battery charger) or left to right (when the converter is acting as a DC-DC converter) through the reactive elements.

Store signal 1214 is used to determine when energy is stored in the reactive elements (i.e., when power from any of the available power buses capable of supplying power will be used to store energy in the windings of the transformer or in the inductor acting as the reactive element in the bidirectional power converter). In other words, when store signal 1214 is a logic high, this input triggers the start of a new power conversion cycle, and power is then transferred to the reactive elements to be stored. When store signal 1214 is a logic low, however, the energy previously stored in the reactive elements is transferred to any combination of the available power buses.

In the converters of FIGS. 8-9 and FIGS. 10-11, store signal 982 originates from PWM latch 872 and PWM latch 982, respectively. In driver 1200, store signal 1214 feeds XOR gate 1235 and determines which of NOR gates 1236 and 1237 is a logic high or a logic low. In this manner, store signal 1214 causes the MOSFETs of the bidirectional power converter to turn ON or OFF, thereby determining which side of the converter is supplying power to the reactive elements.

Synchronous rectification, or rectifier input 1212, on the other hand, receives a signal from a zero current comparator (component 841 in circuits 800 and 900 and component 1032 in circuits 1000 and 1100). This signal allows the driver to facilitate rectification using the switches within the respective circuits, thereby providing control over the power transfer.

In order to control the source of power for charging the reactive elements (e.g., either the battery or the wall adapter for the case of the circuits described above), driver circuitry 1200 also includes a selection signal input. Selection signal 1211 indicates whether or not a wall adapter is supplying power by sensing the presence or absence of a voltage drop across a diode. This signal is provided to driver circuitry 1200, and also selects the sense signal for the error amplifier found in the bidirectional power converter circuitry. For example, in FIG. 8, direction comparator 845 provides driver 860 and switch SW1 893 with a signal depending on the available power from wall adapter 810. Similarly, in FIG. 10, comparator 1031 provides driver 1070 and switch SW2 1092 with a signal depending on the available power from wall adapter 1010. Moreover, selection signal 1211 may also be used in determining that certain operating conditions are met (e.g., that overcharging of a power bus is not occurring). If any of the predetermined operating conditions are not met, selection signal 1211 may stop the transfer of power among the various power buses.

Finally, in the embodiment shown in FIG. 12, driver circuitry 1200 has as an input a burst mode signal input 1213. As described earlier, Burst Mode operation may be incorporated into the embodiments of the bidirectional power converters presented according to the principles of the present invention. Accordingly, when the Burst Mode signal is asserted (i.e., the Burst Mode signal is a logic high), this signal would indicate to the driver that the converter circuitry should enter into sleep mode, at which time both external power MOSFETs are off, thereby improving efficiency.

Further consideration when dealing with circuits that use current-mode controlling (e.g., applicants' claimed bidirectional power converter) should preferably be given to the use of slope compensation. In particular, when dealing with the switching in a fixed frequency, peak-current mode, pulse width modulated power supply, open loop instability or sub-harmonic oscillation can occur when the duty cycle (i.e., the ratio of the switch pulse width to the oscillator period) exceeds about 50%.

A typical solution to this problem is to use a slope compensation signal, derived from the oscillator, to ensure stability regardless of duty cycle. The slope compensation signal can be applied, for example, by either adding or subtracting a portion of the oscillator signal to the current sense signal. Moreover, this can be done by either adding or subtracting a portion of the oscillator signal to the non-inverting terminal of the PWM comparator or the inverting terminal of the PWM comparator.

The slope compensation signal described above causes the perceived rate of current rise in the reactive element to be greater than the rate of current fall, thereby allowing the regulator to operate at duty cycles greater than 50% without becoming unstable. In one embodiment, a slope compensation signal proportional to the duty cycle may be added to from the sense signal to increase the rate of current rise perceived by the control circuitry. As the slope compensation signal progresses towards its peak, the flow of current through the switch is impeded and an increase in the rate of current rise in the reactive element is perceived, allowing the converter to operate at duty cycles greater than 50% without losing stability.

Moreover, the reactive element current down slope (i.e., the current when the reactive element current is decreasing) is a function of the output voltage, or the output voltage minus the input voltage (depending on the power converter topology). For this reason, when the power converter voltages vary widely, the typical approach has been to add enough slope compensation to prevent instability even under the worst case operating conditions. Therefore, the result is excessive slope compensation being used under more normal operating conditions. This is particularly undesirable when dealing with bidirectional power converters, in which power converter voltages commonly have a large range of duty factors. Moreover, because the actual maximum current that can pass through the output switch is generally a function of the amount of slope compensation being used, the problem of overcompensation becomes especially detrimental in bidirectional power converters and causes the actual maximum current that can pass through the output switch to decrease proportionally as the duty cycle increases.

Figure 13:
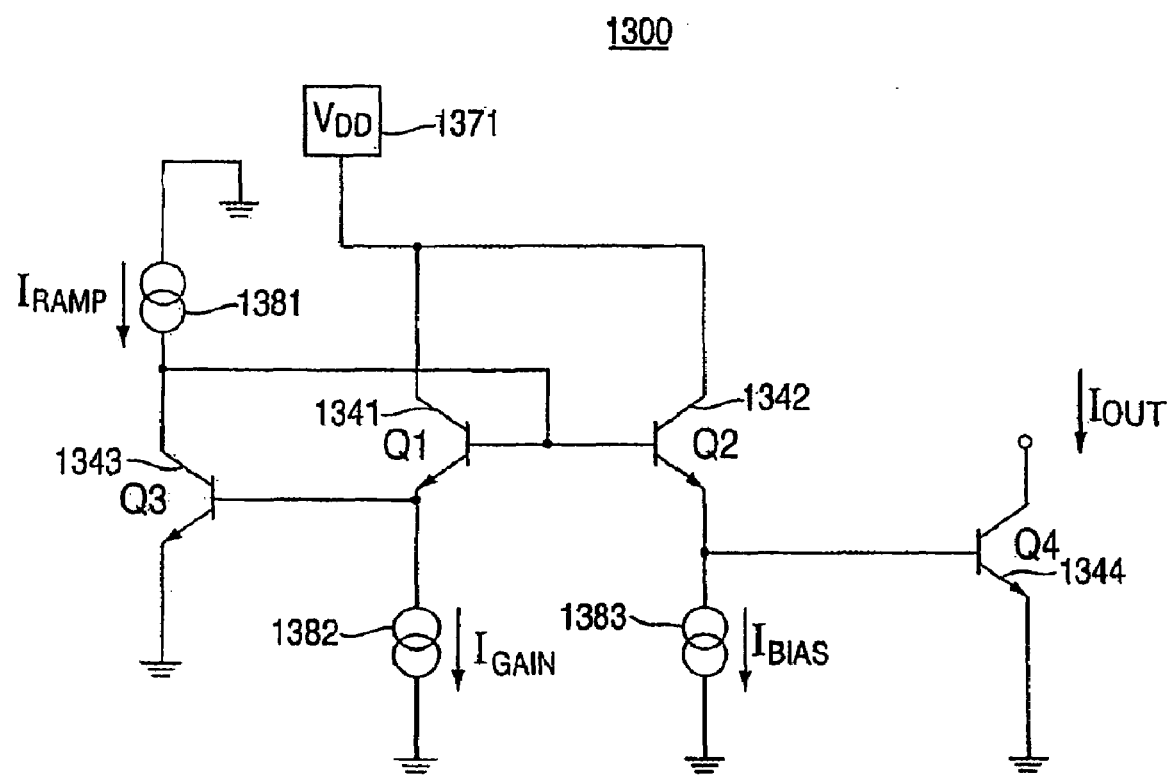
FIG. 13 is a circuit diagram of a simplified adaptive slope compensation network in accordance with the principles of the present invention.

FIG. 13 is a circuit diagram of an adaptive slope compensation network, in accordance with the principles of the present invention, that is capable of substantially eliminating the effects of overcompensating as described above. FIG. 13 accomplishes this by using linear slope compensation waveforms (i.e., adjusting the amplitude of the ramp signal being used by using a linear waveform and adjusting the gain as necessary), and thereby provides an effective slope compensation signal that varies depending on the duty cycle.

In particular, the slope compensation network shown in FIG. 13 has a slope compensating ramp that is amplitude controlled so that it is always optimal. It should be understood that although linear slope compensation waveforms are used in the circuit of FIG. 13, a variable slope compensation signal can also be created by using non-linear waveforms. Nevertheless, when dealing with an extremely wide range of voltages, it is often beneficial to use linear waveforms to avoid excessive errors that can result due to approximation errors associated with non-linear waveforms.

Circuit 1300 shown in FIG. 13 includes a multiplier core of four transistors (components 1341 through 1344), bias currents Iramp 1381, Igain 1382 and Ibias 1383, and a fixed bias $V_{DD}$ 1371 interconnected as shown. In circuit 1300, Vbe4=Vbe3+Vbe1−Vbe2 (where Vbe4 is the voltage differential between the voltages at the base and the emitter of transistor 1344, etc.). Ignoring the base currents (which are negligible), assuming well matched transistors and ignoring other effects, the above equation produces the following equation: $V_t*\ln(\text{Iout}/\text{Is})=V_t*\ln(\text{Iramp}/\text{Is})+V_t*\ln(\text{Igain}/\text{Is})-V_t*\ln(\text{Ibias}/\text{Is})$. After simplifying this equation, we are left with Iout=(Iramp*Igain)/Ibias. Accordingly, controlling the various bias currents allows provides adaptive slope compensation.

Figure 14:
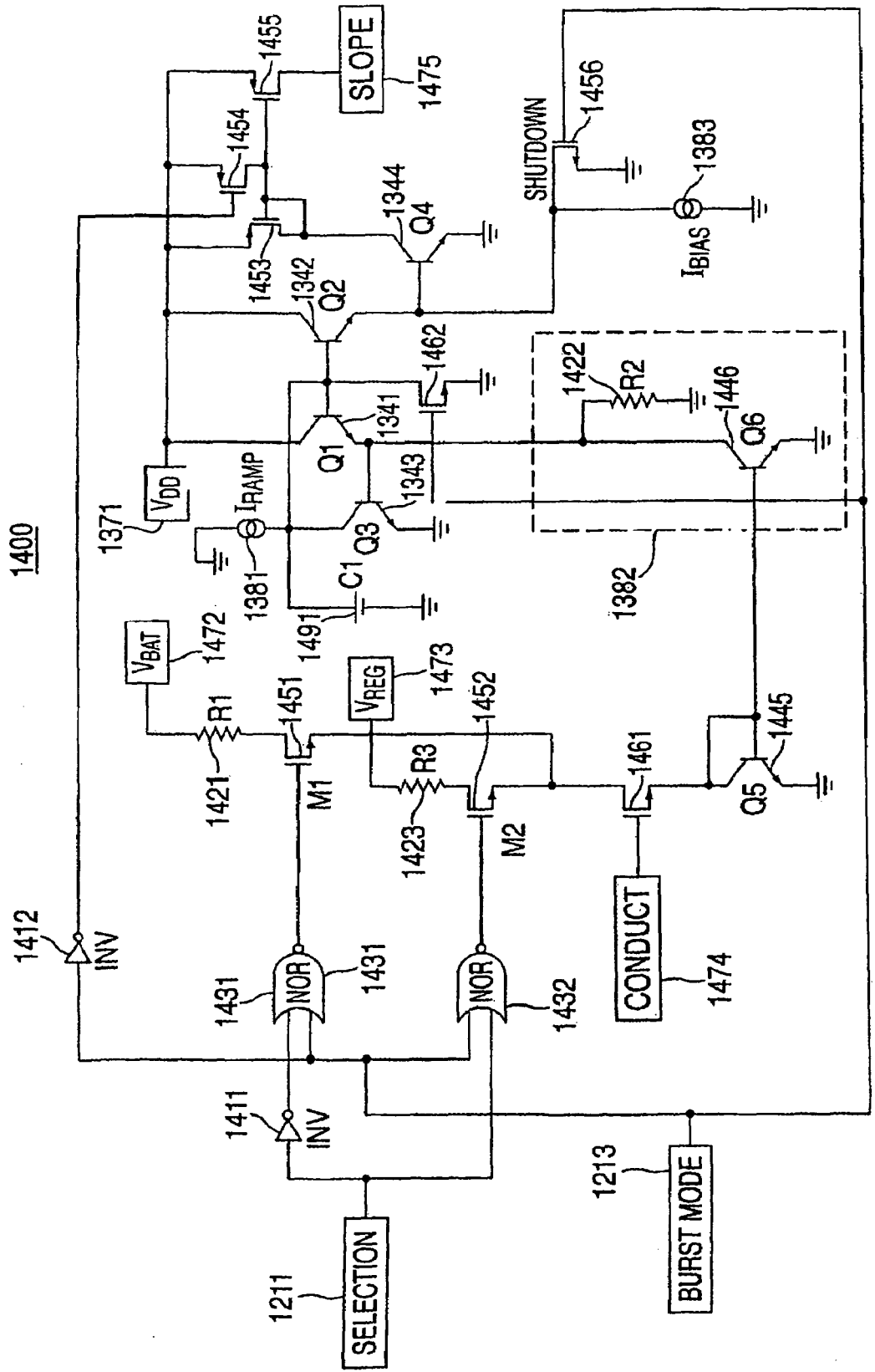
FIG. 14 is a circuit diagram of an embodiment of an adaptive slope compensation network for a bidirectional power converter in accordance with the principles of the present invention.

FIG. 14 shows a circuit diagram of a particular embodiment of an adaptive slope compensation network for a bidirectional power converter in accordance with the principles of the present invention. The multiplier core transistors 1341 through 1344 are labeled and configured in the same manner as in circuit 1300, and selection signal 1211 and burst mode signal 1213 are the same signals as described above for FIG. 12. C1 in circuit 1400 provides compensation of the loop formed by transistor Q1 1341 and Q3 1343. Resistors R1 1421, R2 1422 and R3 1423, and transistors Q5 1445 and Q6 1446 serve as a voltage to current converter with having first order voltage/current non-linearity compensation (caused by Q5 1445).

Assuming conduct signal 1474 is a logic high, MOSFETs M1 1451 and M2 1452 select the correct gain control signal from either $V_{BAT}$ or $V_{REG}$ for the slope compensation (based on what voltage is determining the reactive elements downslope). These MOSFETs are turned ON and OFF, respectively, by NOR gates 1431 and 1432 (which are controlled by selection signal 1211). Furthermore, logic inverters 1411 and 1412 provides decoding for voltage selection and shutdown, and all remaining transistors and mosfets (labeled components 1453-1456, and 1461-1462 in FIG. 14) provide either current mirroring or shutdown in circuit 1400.

Circuit 1400, using the components described above and interconnected as shown in FIG. 1400, provides slope compensation waveform 1475 which is used in the bidirectional power converter to ensure stability, regardless of duty cycle, and allows this to be done without resulting in overcompensation. Accordingly, waveform 1475 can be either supplied to the non-inverting terminal or the inverting terminal of the PWM comparator (e.g., component 1035 in FIG. 10), depending on whether it is preferable to add a portion of the oscillator signal to the current sense signal or rather, to subtract a portion of the oscillator signal.

The above described embodiments of the present invention are presented for purposes of illustration and not of limitation, and the present invention is limited only by the claims which follow.

What is claimed is:

1. A driver circuit for controlling the switching of at least two power switches in a bidirectional power converter, said at least two power switches intermittently connecting at least two power buses to a reactive element, said driver circuit comprising at least first and second anti-cross conduction circuits, the outputs of said first and second anti-cross conduction circuits that drive said power switches based on at least a selection signal, the output of the first anti-cross conduction circuit being fed back to the second anti-cross conduction circuit, the output of the second anti-cross conduction circuit being fed back to the first anti-cross conduction circuit.

2. The driver circuit of claim 1, said driver circuit comprising at least one level shifter that receives at least said selection signal, said level shifter that increases the voltage level of said selection signal prior to providing said selection signal voltage level to said first and second anti-cross conduction circuits.

* * * * *

UNITED STATES PATENT AND TRADEMARK OFFICE
CERTIFICATE OF CORRECTION

PATENT NO. : 7,538,532 B2
APPLICATION NO. : 12/076302
DATED : May 26, 2009
INVENTOR(S) : Thomas P. Hack et al.

It is certified that error appears in the above-identified patent and that said Letters Patent is hereby corrected as shown below:

In Column 5, Line 62, change "non-insulating" to -- non-insulated --;

In Column 11, Line 28, change "(i.e., resistive-conductive)" to -- (i.e., resistive-capacitive) --;

In Column 11, Line 66, change "1099" to -- 1091 --;

In Column 14, Line 44, change "1255" to -- 1253 --; and

In Column 15, Line 17, change "982" to -- 1082 --.

Signed and Sealed this

Seventeenth Day of November, 2009

David J. Kappos
*Director of the United States Patent and Trademark Office*